United States Patent
Sakai

(10) Patent No.: US 7,774,706 B2
(45) Date of Patent: Aug. 10, 2010

(54) SYSTEM AND METHOD FOR MIXING MEDIA CONTENT

(75) Inventor: Ryutaro Sakai, Marina Del Rey, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 318 days.

(21) Appl. No.: 11/385,469

(22) Filed: Mar. 21, 2006

(65) Prior Publication Data

US 2007/0226607 A1    Sep. 27, 2007

(51) Int. Cl.
*G06F 3/00* (2006.01)
(52) U.S. Cl. .................. 715/723; 715/716; 715/727
(58) Field of Classification Search ......... 715/716–717, 715/723–624, 724, 719–728; 345/473
See application file for complete search history.

(56) References Cited

U.S. PATENT DOCUMENTS

| | | | |
|---|---|---|---|
| 5,524,195 A | 6/1996 | Clanton et al. | |
| 5,952,995 A | 9/1999 | Barnes | |
| 5,999,173 A * | 12/1999 | Ubillos | 715/724 |
| 6,259,436 B1 | 7/2001 | Moon et al. | |
| 6,490,359 B1 * | 12/2002 | Gibson | 381/119 |
| 6,504,530 B1 | 1/2003 | Wilson et al. | |
| 6,710,754 B2 | 3/2004 | Hanson et al. | |
| 6,714,215 B1 | 3/2004 | Flora et al. | |
| 7,176,902 B2 | 2/2007 | Peterson et al. | |
| 7,325,199 B1 * | 1/2008 | Reid | 715/723 |
| 2002/0109678 A1 | 8/2002 | Marmolin et al. | |
| 2003/0090504 A1 | 5/2003 | Brook et al. | |
| 2003/0237043 A1 | 12/2003 | Novak et al. | |
| 2005/0010955 A1 | 1/2005 | Elia et al. | |
| 2005/0021478 A1 | 1/2005 | Gautier et al. | |
| 2006/0007151 A1 | 1/2006 | Ram | |
| 2006/0022956 A1 * | 2/2006 | Lengeling et al. | 345/173 |
| 2006/0055700 A1 * | 3/2006 | Niles et al. | 345/473 |
| 2006/0259877 A1 | 11/2006 | Kaminagayoshi | |

OTHER PUBLICATIONS

U.S. Appl. No. 11/539,547, Sakai, Ryutaro.
Teo, Fred, "hands on 2002 I want to tune in, too", http://homepage.mac.com/mvallance/vallance/270202/iTunes2,html, 3 pages.
Int'l Searching Authority, *International Search Report and Written Opinion of the International Searching Authority* for PCTUS0780253 mailed Sep. 19, 2008.
USPTO, Office action from U.S. Appl. No. 11/539,547 mailed Jun. 24, 2008.
USPTO, Final Office Action from U.S. Appl. No. 11/539,547 mailed Jan. 29, 2009.
USPTO, Examiner's Answer to Appeal Brief from U.S. Appl. No. 11/539,547, mailed Dec. 28, 2009.

* cited by examiner

*Primary Examiner*—Ba Huynh
*Assistant Examiner*—Enrique W Iturralde
(74) *Attorney, Agent, or Firm*—Fitch, Even, Tabin & Flannery

(57) ABSTRACT

A visual display interface is provided that comprises an associated display icon. The display icon is dragged across the visual display interface in a movement so as to cause the mixing of a plurality of media streams. The output is a new mix of the various media streams.

8 Claims, 9 Drawing Sheets

FIG. 5
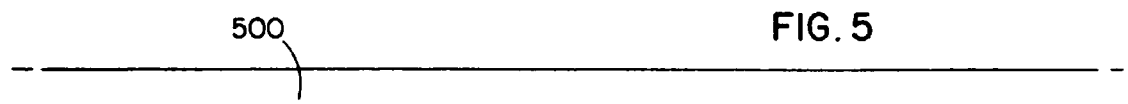
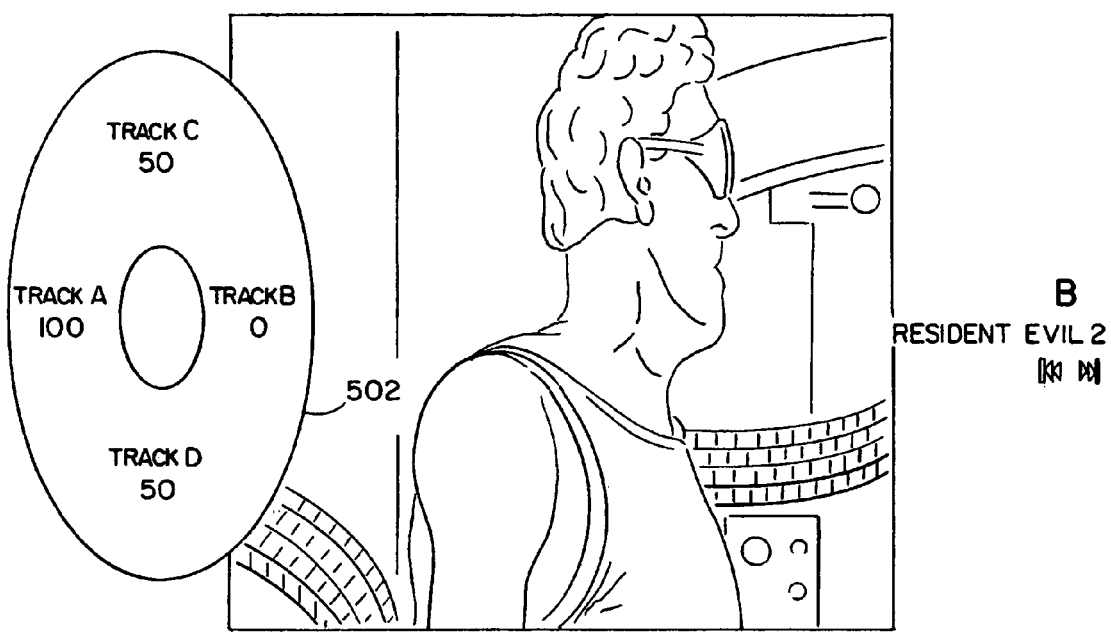
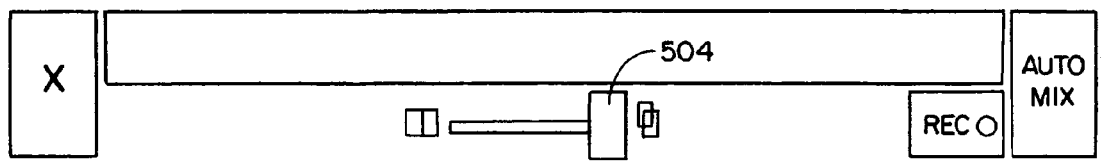

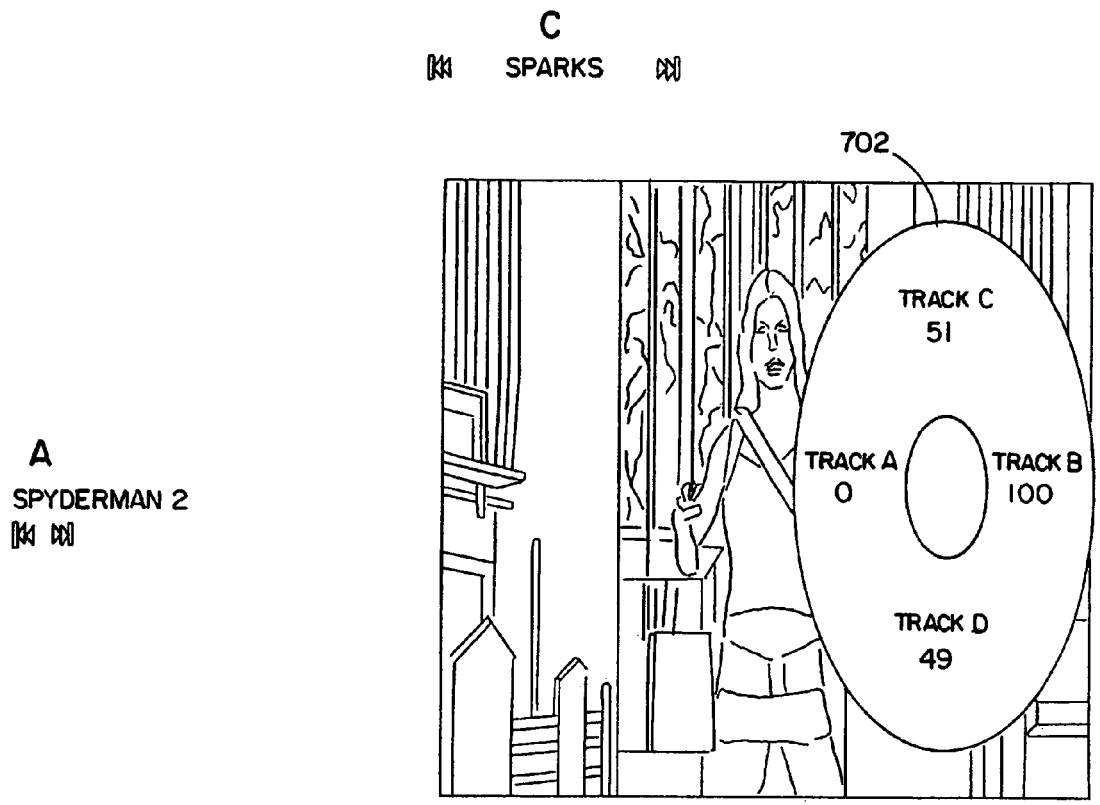
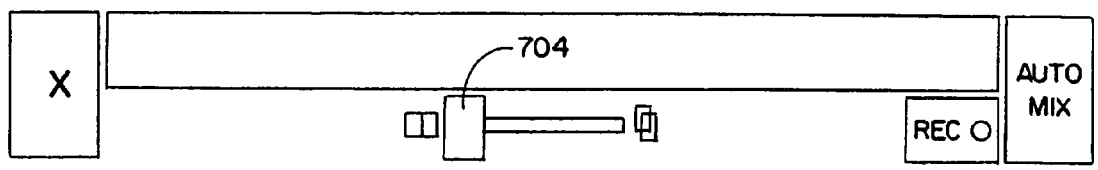
FIG. 7

FIG. 8
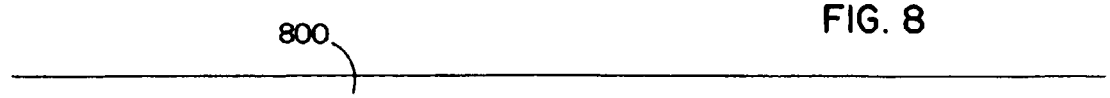
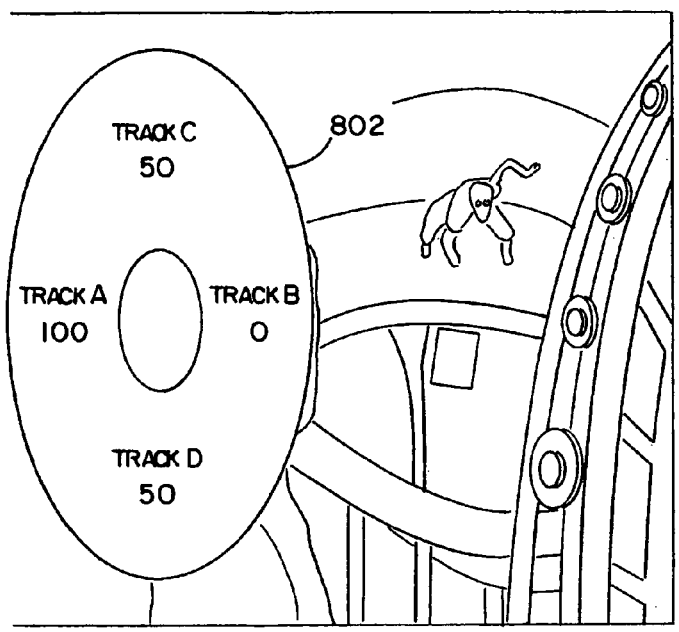
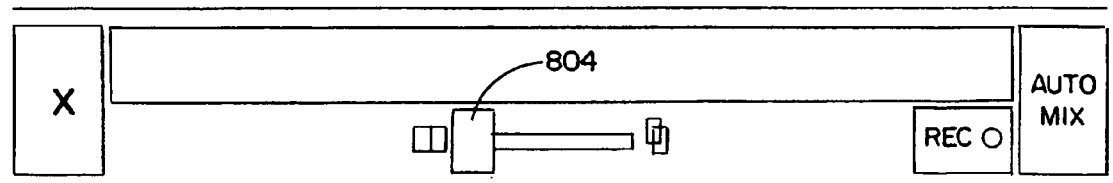

SYSTEM AND METHOD FOR MIXING MEDIA CONTENT

FIELD OF THE INVENTION

The field of the invention relates to providing media services and more specifically to mixing media content for these services.

BACKGROUND OF THE INVENTION

Various types of media provide different content in varied formats to users. For example, movies, DVDs, video cassettes, audio cassettes, audio compact discs, and digital photographs provide various types of audio and visual content to today's consumers.

The different types of media may be created in a number of ways. For instance, two or more existing media streams are sometimes combined or mixed together to create a new media stream. The mixing of the different streams of information often creates a product having desirable characteristics with a unique appeal to various types of consumers.

Previous systems and approaches provided for the mixing of audio and visual streams of information. For instance, previous video editors provided for the mixing of different video streams, such as movies or video tape. Unfortunately, these editors often required the use of a complex user interface that employed multiple, non-intuitive instructions to facilitate the mixing. In addition, these previous approaches often relied upon non-intuitive instruction sequences to perform the mixing. Consequently, the user frequently was forced to consult with complicated manuals or seek outside advice in order to correctly complete the mixing.

All these problems with previous approaches led to the mixing requiring a substantial amount of time and effort. In addition, if performed in a commercial setting, worker efficiency was often significantly reduced. Expensive working training was also often needed in order to properly and effectively operate the editor. Even if the editor were used in a non-commercial environment, the amount of time and effort required to create desirable results frequently led to user frustration with the system and the mixing experience.

SUMMARY OF THE INVENTION

A system and method are provided that allow for the convenient and intuitive mixing of audio and visual streams of information. An interface is provided that allows a user to easily, quickly, and correctly mix audio and visual content as desired. The approaches described herein provide the desired results without having to utilize complex editing programs, usage manuals, or training courses.

In many of these embodiments, a visual display interface is provided on a display device. The visual display interface includes an associated display icon that is moveable across the interface. In this regard, the display icon is dragged across the visual display interface so as to cause the mixing of the media streams. The mixing results in a new media stream that comprises a custom mix of the input media streams.

Any number or type of media may be mixed. For example, a first audio stream may be mixed with a second audio stream and a first visual stream may be mixed with a second visual stream. Other types and combinations of media may also be mixed.

Movement of the icon in particular directions on the interface affects how the various media streams are applied to the final mixed product. In addition, the relative position of the icon on the interface affects the percentage of a particular media stream in the mix. In one example, dragging the icon in a generally vertical direction causes the mixing of the first and second audio streams. In another example, dragging the display icon in a generally horizontal direction causes the mixing of the first and second visual streams. In still another example, the icon is dragged in both the vertical and horizontal directions. In this case, dragging the icon in the vertical direction causes the mixing of the first and second audio streams and dragging the controller icon in the horizontal direction causes the mixing of the first and second visual streams.

In many of these embodiments, a visual overlap slider is also provided. In one example, the visual overlap slider controls the degree of overlap between the two media streams, for instance, the first visual stream and the second visual stream mentioned previously. In one preferred approach, the slider may provide a range of overlap of the two video streams from no overlap (where the video images are side-by-side), to total overlap (where the video images are one on-top of the other).

The display icon can be moved either automatically or manually. For instance, the movement of the display icon can also be programmed ahead of time if automatic movement is desired. On the other hand, a user may manually drag the icon, for instance, by using their hands and fingers.

Thus, different media streams are conveniently mixed together using an intuitive user interface thereby providing a unique and desirable resultant media mix. The approaches described herein do not require the consultation of complex manuals or other sources of information in order to efficiently perform the mixing. In addition, since the approaches herein are intuitive for the user, training to perform the mixing is significantly reduced or eliminated.

BRIEF DESCRIPTION OF THE DRAWINGS

FIG. 5 is a diagram showing one example of an interface for mixing audio and visual content according to the present invention;

FIG. 7 is a diagram showing one example of an interface for mixing audio and visual content according to the present invention;

FIG. 8 is a diagram showing one example of an interface for mixing audio and visual content according to the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

Figure 1:
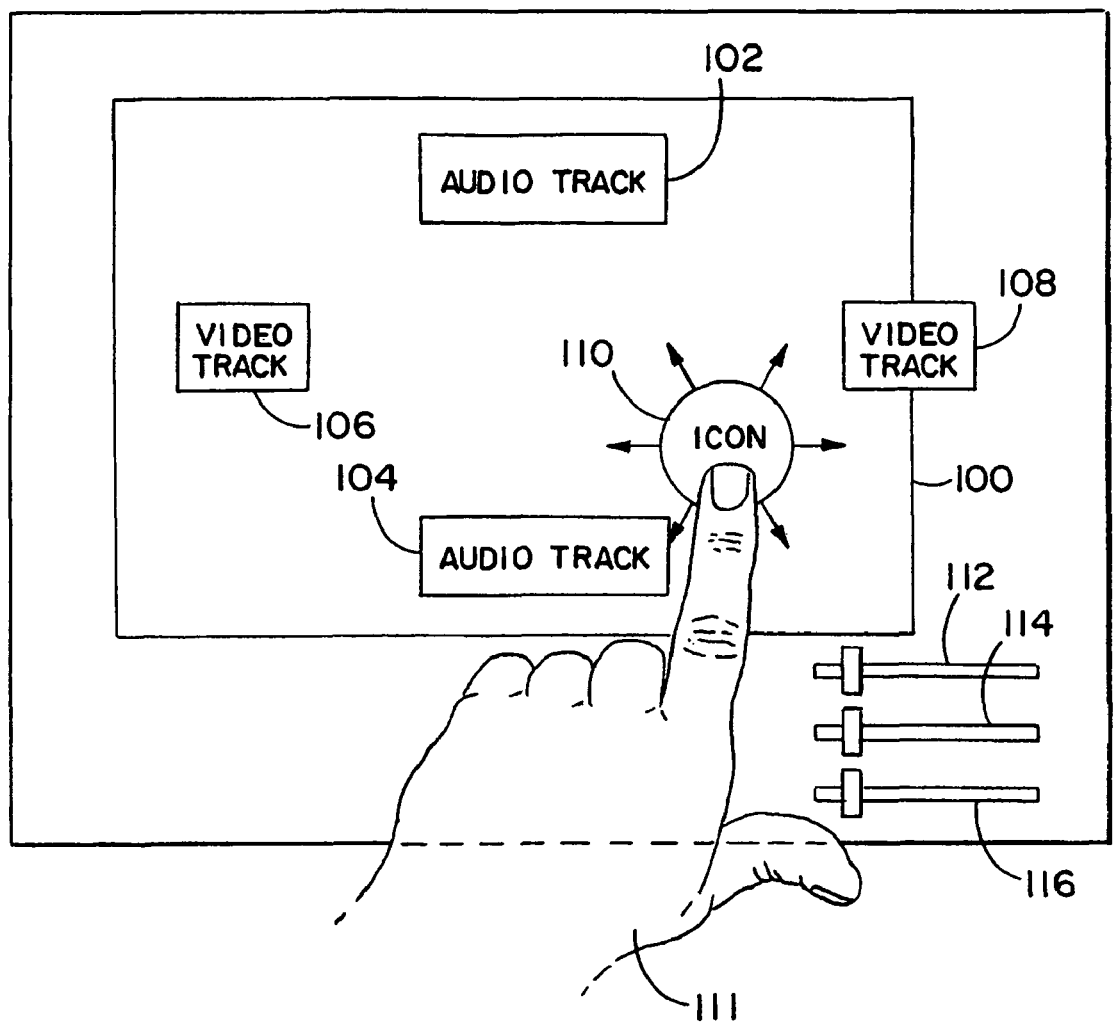
FIG. 1 is a diagram of a system for mixing audio and visual content according to the present invention.

Referring now to FIG. 1, one example of a user interface 100 for facilitating the mixing of media streams (e.g., audio and visual content) is described. The user interface 100 may be any type of visual interface that allows for the mixing of media streams. In one example, the user interface 100 may utilize a computer screen, touch screen and/or soft keys to provide a graphical user interface to a user. In this regard, the user interface 100 may be associated with any suitable device such as a personal computer, cellular phone, pager, or personal digital assistant. Alternatively, the user interface 100 may be associated with a separate, dedicated device that is only used for mixing.

In the example of FIG. 1, the user interface 100 comprises media stream display areas 102, 104, 106, and 108. The display areas 102, 104, 106 and 108 may be of any size or dimension so that they fit within the boundaries of the interface. Preferably, the display areas 102, 104, 106, and 108 are provided in a visually pleasing arrangement that is conducive to viewing and interaction for users of the system.

Each of the display areas 102, 104, 106, and 108 provides information concerning a particular media stream and/or the media stream itself. For instance, when the media stream is a movie, the name of the movie may be displayed along with the movie itself. On the other hand, when the media stream is an audio track (such as a musical recording), only the name of the artist and song may be displayed. In other examples, the album jacket cover art, photo of an artist, or video of an artist could also be displayed.

The media streams that are mixed can provide any type of content. For example, the audio streams can be music recordings, voice recordings, or any type of audio information. Similarly, the visual content can originate from any visual source such as movies, television programs, home video recordings, digital photographs, other static images, or any other type of video recording. Other examples of audio and visual content are possible.

In the example shown in FIG. 1, the display area 102 displays information concerning a first audio stream (i.e., a first song title) and the display area 104 displays information concerning a second audio stream (i.e., a second song title). On the other hand, display area 106 displays information concerning a first visual stream (i.e., a first movie title and a first movie), and the display area 108 displays information concerning a second visual stream of information (i.e., a second movie title and a second movie).

An icon 110 is moved by a user 111 across the interface (e.g., across a display). The icon 110 is a visual computer graphic image of suitable dimensions so as to be easily seen and dragged by the user. In this example, the movement of the icon 110 is accomplished by touching the icon with the fingers of the user and then subsequently dragging the icon 110 in a particular movement across the user interface 100. In alternative examples, the icon 110 can be moved by any suitable means such as by a stylus, pointer, keypad, voice activation device, or any other suitable mechanism.

Movement of icon 110 causes the mixing of the media streams. In the example of FIG. 1, a first audio stream is mixed with a second audio stream and a first visual stream is mixed with a second visual stream. As shown, the display area 102 is on the top of the interface and opposite the display area 104 (on the bottom). Similarly, display area 106 is on the left side of the interface while the display area 108 is positioned on the right side of the display interface. Although the audio and visual display areas are positioned opposite in this example, other placements are possible.

Movement of the icon 110 between the opposite display areas causes the mixing of the media with the amount of a particular media in the mix related to the relative positioning of the icon 110. For example, with the icon 110 positioned closer to the top, the media associated with the display area 102 is a higher percentage of the mix. On the other hand, with the icon positioned near the bottom of the interface, a higher percentage of the media associated with display area 104 is used in the mix.

A visual overlap slider 112 is also provided to indicate the degree of overlap between media streams, for instance, the visual streams. In this regard, full screen overlap may be used (one image directly over the other image). In another example, no overlap is used (the images are side-by-side). In another example, partial overlap is used (the images have portions that overlap).

In addition, a horizontal position limit slider 114 indicates the amount of movement of the icon 110 allowed in the horizontal direction. A vertical position limit slider 116 may indicate the amount of movement allowed by the icon 110 in the vertical direction. Other examples of sliders and function keys may also be provided.

In one example of the operation of the system of FIG. 1, the icon 110 is dragged across the user interface 100 in a movement so as to cause the mixing of a plurality of media streams. The dragging of the icon 110 creates a new mix of the various media streams.

As mentioned, movement of the icon 110 in particular directions affects the amount of a particular media stream that is used in the final mix. In one example, dragging the icon 110 in a generally vertical direction causes the mixing of the first and second audio streams. In another example, dragging the icon 110 in a generally horizontal direction causes the mixing of the first and second visual streams. In still another example, the icon 110 is dragged in both the vertical and horizontal directions. In this case, dragging the icon 110 in the vertical direction causes the mixing of the first and second audio streams and dragging the icon 110 in a generally horizontal direction causes the mixing of the first and second visual streams.

The visual overlap slider 112 controls the degree of overlap between the first visual stream and the second visual stream. In this case, the overlap slider is in a far left position causing no overlap to occur (the images are side-by-side).

The icon 110 can be moved wither automatically or manually. The movement of the display icon can also be programmed ahead of time in some of these examples. In other examples, a user manually drags the icon, for instance, by using their hands and/or fingers.

Figure 2:
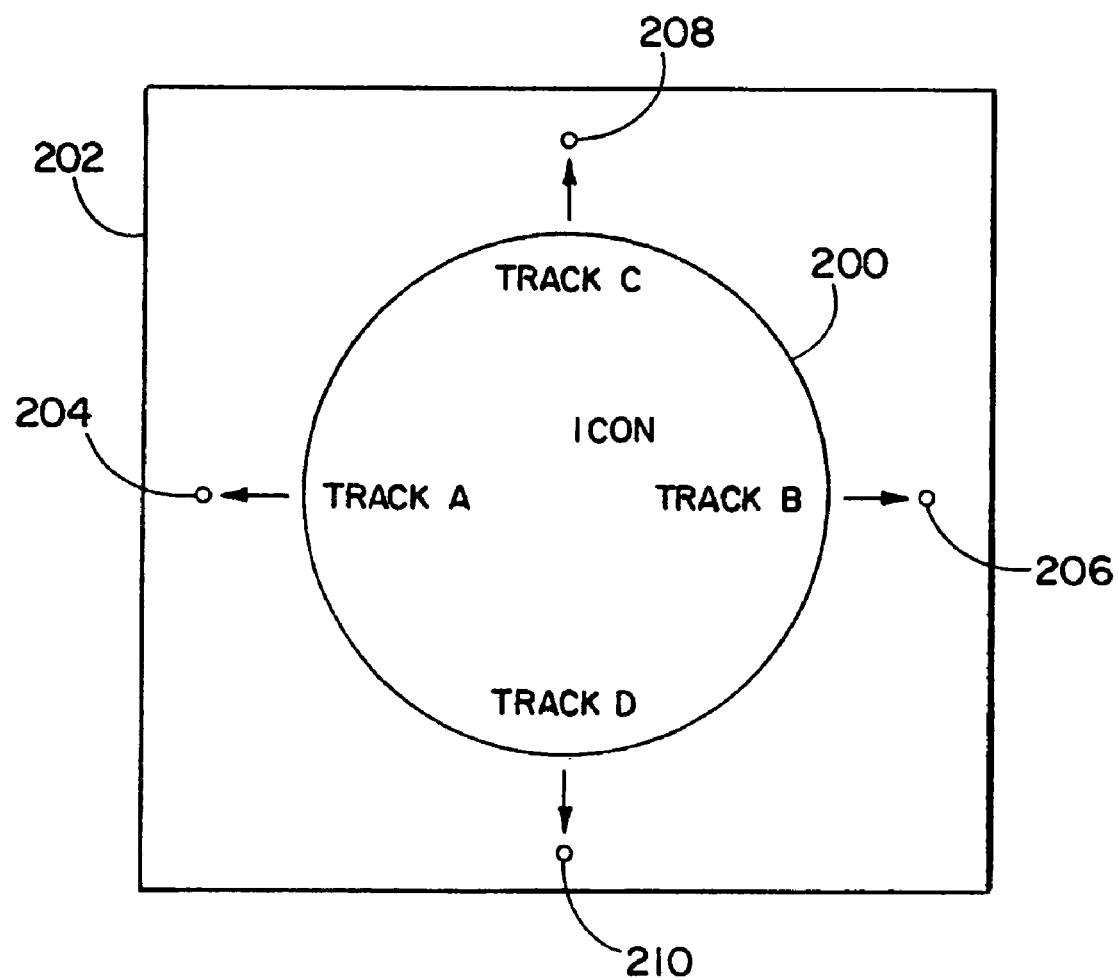
FIG. 2 is a diagram of an icon for allowing the mixing of audio and visual content according to the present invention.

Referring now to FIG. 2, one example of an icon 200 as used on a display 202 is described. The icon 200 is moved across the display 202 to increase or decrease the percentage or amount of a particular track in a resultant mix. Each stream (or track of a stream) has an associated label (e.g., Track A, Track B, Track C, and Track D) that is provided on the display (or screen) 202. Moving the icon 200 generally towards the label increases the percentage of the stream (or track) associated with the label in the final mix while moving the icon

200 generally away from the label decreases the percentage of the stream (or track) associated with the label.

The icon 200 includes informational areas that show the relative percentage of a media stream in the mix. In the example of FIG. 2, the informational areas are a digital readout of the percentage of a media stream in the mix. Alternatively, the informational areas may be omitted from the icon 200 or positioned elsewhere on the screen 202.

In the example of FIG. 2, Tracks A and B are video streams and Tracks C and D are audio streams. Moving the icon 200 leftward increases the percentage of Track A while decreasing the percentage of Track B in the mix. Conversely, moving the icon 200 rightward across the screen 202 causes the percentage of Track A to decrease and the percentage of Track B to increase.

Moving the icon 200 upward causes the percentage of Track C in the mix to increase and the percentage of Track D to decrease. On the other hand, moving the icon 200 downward causes the percentage of Track C to decrease while the percentage of Track D increases. Moving the icon 200 to the middle of the screen 202 results in roughly equal percentages of Tracks A, B, C, and D being used in the resultant mix. In this particular example, opacity of the video streams and volume of the audio streams change in the mix.

Now turning to other examples, moving the icon 200 to a position 204 on the display causes Track A to become 100 percent of the video portion of the mix with track B being 0 percent. As for the audio portion of the mix, with the icon 200 at position 204, Track C is 50 percent of the mix and Track D is 50 percent of the mix.

Moving the icon 200 to position 206 causes the video portion to consist of 0 percent from Track A and 100 percent from Track B. At position 206, Track C is 50 percent of the audio portion of the mix, while Track D is 50 percent.

Moving the icon 200 to position 208 causes Track A to 50 percent of the video portion of the mix with Track B being 50 percent. As for the audio portion of the mix, Track C is 100 percent and Track D is 0 percent of the mix.

Moving the icon to position 210 causes Track A to become 50 percent of the video portion of the mix with Track B being 50 percent. Track C is 0 percent of the audio portion of the mix and Track D is 100 percent.

Figure 3:
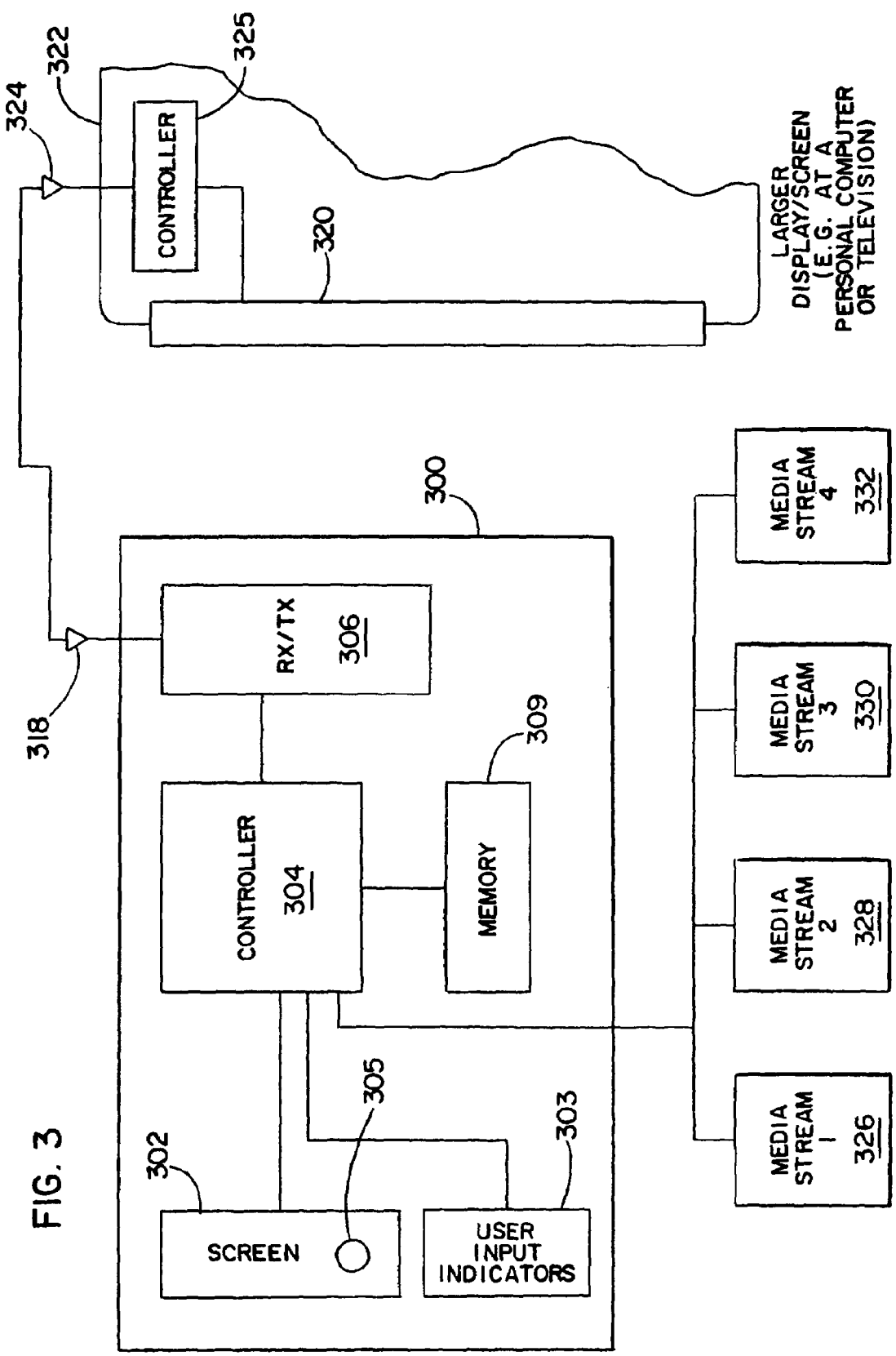
FIG. 3 is a block diagram of a system for mixing audio and visual content according to the present invention.

Referring now to FIG. 3, one example of a system for facilitating the intuitive mixing of different media streams is described. A mixing device 300 includes a screen 302, user input indicators 303, a controller 304, an icon 305, receive and transmit (RX and TX) circuit 306, and a memory 308. A viewing device 322 comprises an antenna 324, a controller 325, and a screen 320.

At the mixing device 300, the screen 302 is coupled to the controller 304. The controller 304 is coupled to the 303 user input indicators, the memory 308, the RX and TX circuit 306, the media streams 326, 328, 330, and 332, and communicatively coupled to the icon 305 via the screen 302. The RX and TX circuit is coupled to the antenna 318.

At the viewing device 322, the antenna 324 is coupled to the controller 325. The controller 325 is coupled to the screen 320.

The screen 302 presents a visual interface including the icon 305. For example, the icon illustrated in FIG. 1 or 2 may be used. The controller 304 receives media streams 326, 328, 330 and 332 (and/or different tracks from these streams), converts them into an appropriate format, and stores these in the memory 308. For example, media stream 326 may be a first movie; media stream 328 may be a second movie; media stream 330 may be a first audio track (e.g., a song or portion from a song); and media stream 332 may be a second audio track.

The controller 304 also determines and provides information on the screen 302 concerning the different streams so that a user can perform mixing. Thus, the controller 304 may show the titles and images of the movies on portions of the screen 302. In addition, the controller 304 may provide the titles of the audio tracks on other portions of the screen 302. It will be appreciated that the number and types of media, any information concerning the media, and the exact positioning of the information concerning the media on the screen 302 may vary according to the needs of the user and the limits of the system. The controller 304 receives an indication of movement of the icon 305 and is programmed to selectively cause the mixing of a plurality of media streams based upon the indication of the movement of the display icon.

User input indicators 303 may also be provided. For example, these may include an overlap slider (for controlling the amount of overlap of streams); horizontal and vertical position sliders (to control the extent of horizontal and vertical movement of the icon); a record button (to record movement of the icon 305 and store this in the memory 308); and an auto mix button (to supply a controller generated automatic movement for the icon 305).

In many situations, it is desirable that the media be displayed or the final mix viewed on a screen larger than the screen 302. For example, the user may not wish to look at a small screen, but may wish to look at the display and watch and hear the mixing results on a larger device such as a large screen television or the like. In this regard, the controller 304 transmits the mix to the RX and TX circuit 306. The RX and TX circuit 306 converts the information into a format and form that facilitates transmission.

Thereafter, the antenna 318 transmits the mix to the second antenna 324 at a viewing device 322 so that the information can be displayed on a larger screen at the viewing device 322. Specifically, the controller 325 receives the information from the antenna, formats the information for display, and forwards the information to the display 320 for viewing.

Figure 4:
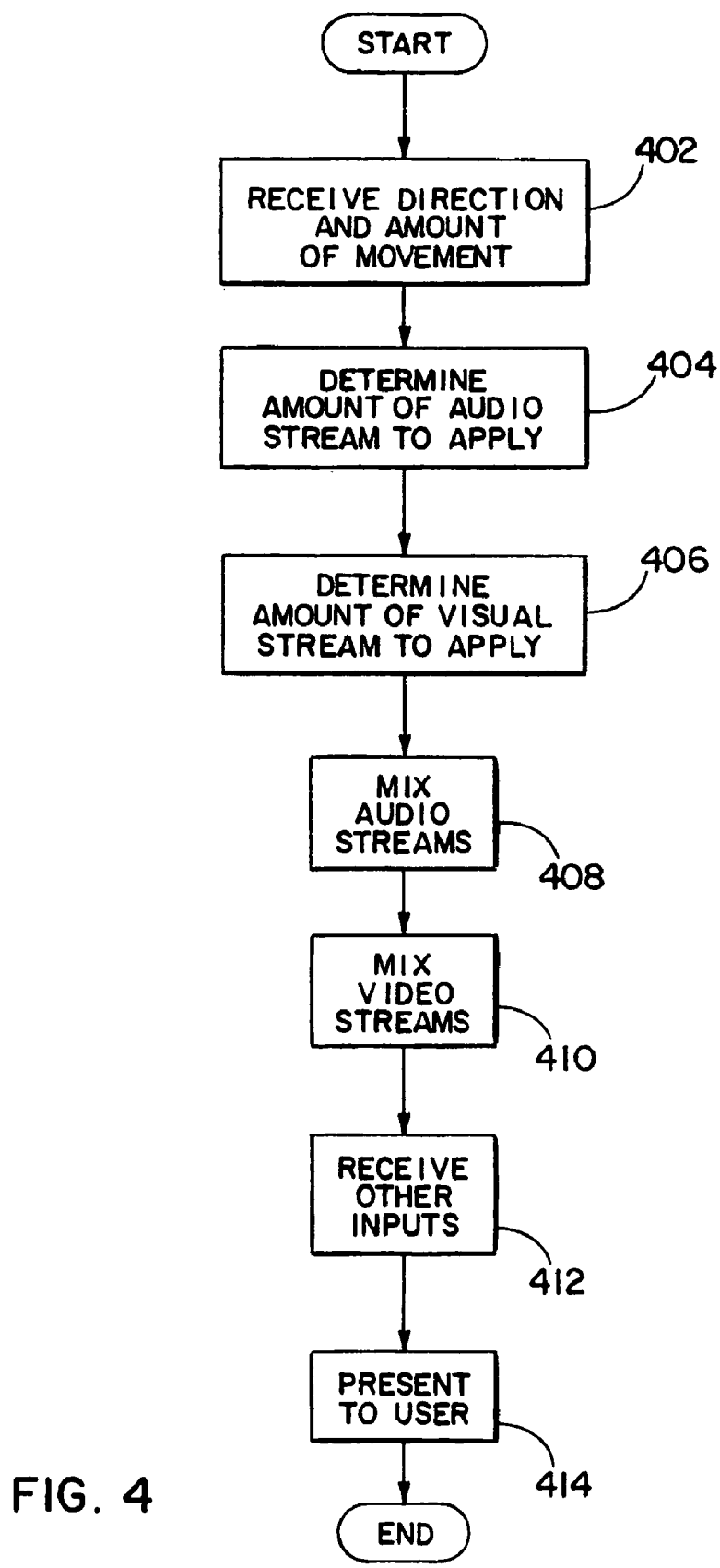
FIG. 4 is a flowchart of one approach for mixing audio and visual content according to the present invention.

Referring now to FIG. 4, one example of an approach for mixing media content interactively is described. This example assumes that first and second audio tracks are mixed together and first and second visual tracks are mixed together on a graphical user interface. An icon is provided and moved to facilitate the mixing of the audio and visual tracks. In this example, moving the icon in a generally horizontal direction across the user interface causes the first and second visual tracks to be mixed and moving the icon in the vertical direction across the interface causes the first and second audio tracks to be mixed.

As mentioned previously, the icon may be a visual symbol on the face of a video screen that is moved by the hand of a user. Alternatively, a stylus or similar mechanism may be used to move the icon. In still another example, computer keys may be used to program the position of the icon. Other mechanisms and approaches for providing for icon movement are possible.

At step 402, an indication of the direction and amount of the movement of the icon is received. The indication may be in the form of an electrical signal that includes components indicative of the amount of vertical and horizontal movement of the icon across the interface. The generation of the electrical signal is accomplished using techniques and approaches that are known to those skilled in the art and will not be discussed in greater detail herein.

At step 404, the amount (i.e., percentage) of each visual stream to be applied to the mix is determined by processing the signal. For example, the components of the electrical signal indicating the horizontal position are extracted, and an amount (i.e., percentage) of each visual track to be applied to the mix is determined based upon the determined horizontal position of the icon.

At step 406, the amount (i.e., percentage) of each audio stream to be applied to the mix of movement is determined by processing the signal. For example, the components of the electrical signal indicating the vertical position are extracted, and an amount (percentage) of each audio track to be applied to the mix is determined based upon the vertical position of the icon.

At step 408, the first and second visual streams are mixed together according to the percentages determined at step 404. At step 410, the first and second audio streams are mixed according to the percentages determined at step 406.

At step 412, any other inputs are received that affect the presentation of the final mix to the users. For example, an overlap slider may indicate the degree of overlap of the first and second visual streams. Other examples of sliders and function keys may also be used and their inputs processed.

At step 414, the mixed resultant stream of information is presented to the user on the visual interface for viewing. The resultant stream may also be stored in memory or any other storage media or device for future use.

Referring now to FIGS. 5-9, further examples of graphical user interfaces are described. In each case, two video streams (tracks) A and B and two audio streams (tracks) C and D are being mixed. The interfaces are video screens and display a moveable graphical icon. In these examples, movement of the icon is accomplished by having a user touch the icon with their hand or finger and manually drag the icon to the desired position on the interface. The icon has associated digital display areas that show the percentage of a particular track being used in the resultant mix.

Referring now specifically to FIG. 5, an example of a user interface 500 that facilitates mixing of media streams is described. The user interface 500 comprises an icon 502 and an overlap slider 504. The icon 502 is positioned at the center left of the user interface 500 and indicates that for the audio mix, track C constitutes 50 percent and track D constitutes 50 percent of the audio mix. As for the video mix, the icon 502 shows that track A constitutes 100 percent of the mix and track B constitutes 0 percent of the video mix.

The overlap slider 504 determines the degree of visual source overlap of the visual streams. For example, as shown in FIG. 5, full screen overlap may be used (one image directly over the other image) when the slider 504 is positioned at the far right of its range. In another example, no overlap is provided (the images are side-by-side) when the slider 504 is positioned at the far left of its range. In another example, partial overlap is provided (the images have portions that overlap) when the slider 504 is positioned in between the extremes of its allowed movement.

Figure 6:
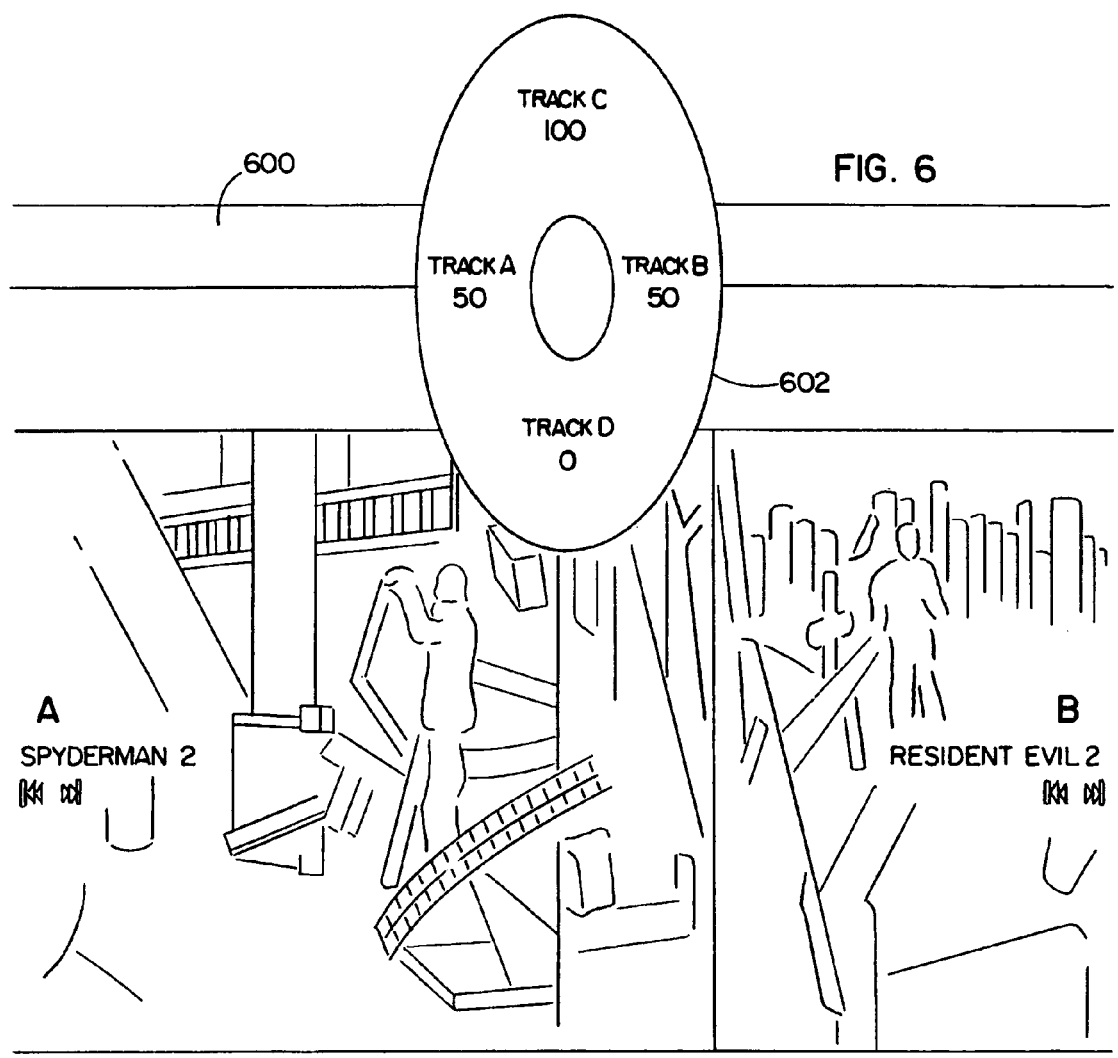
FIG. 6 is a diagram showing one example of an interface for mixing audio and visual content according to the present invention.

Referring now specifically to FIG. 6, another example of a user interface 600 is described. The user interface 600 comprises an icon 602 and an overlap slider 604. The icon 602 is positioned at the top center of the user interface 600 and indicates that for the audio mix, track C constitutes 100 percent and track D constitutes 0 percent of the audio mix. As for the video mix, the icon 602 shows that track A constitutes 50 percent and track B constitutes 50 percent of the video mix. The overlap slider 604 is positioned at the far left of its sliding range and indicates that there is no overlap of the video segments (i.e., the video segments are placed one next to the other).

Referring now specifically to FIG. 7, another example of a user interface 700 is described. The user interface 700 comprises an icon 702 and an overlap slider 704. The icon 702 is positioned at the top center of the user interface 700 and indicates that for the audio mix, track C constitutes 51 percent and track D constitutes 49 percent of the audio mix. As for the video portion of the mix, the icon 702 shows that track A constitutes 0 percent and track B constitutes 100 percent of the video mix. The overlap slider 704 is positioned at the far left of its sliding range and indicates that there is no overlap of the video segments (i.e., the video segments are placed one next to the other).

Referring now specifically to FIG. 8, another example of a user interface 800 is described. The user interface 800 comprises an icon 802 and a visual overlap slider 804. The icon 802 is positioned at the top center of the interface 800 and indicates that for the audio mix, track C constitutes 50 percent and track D constitutes 50 percent of the audio mix. As for the video mix, the icon 802 shows that track A constitutes 100 percent and track B constitutes 0 percent of the video mix. The overlap slider 804 is positioned at the far left of its sliding range and indicates that there is no overlap of the video segments (i.e., the video segments are placed one next to the other).

Figure 9:
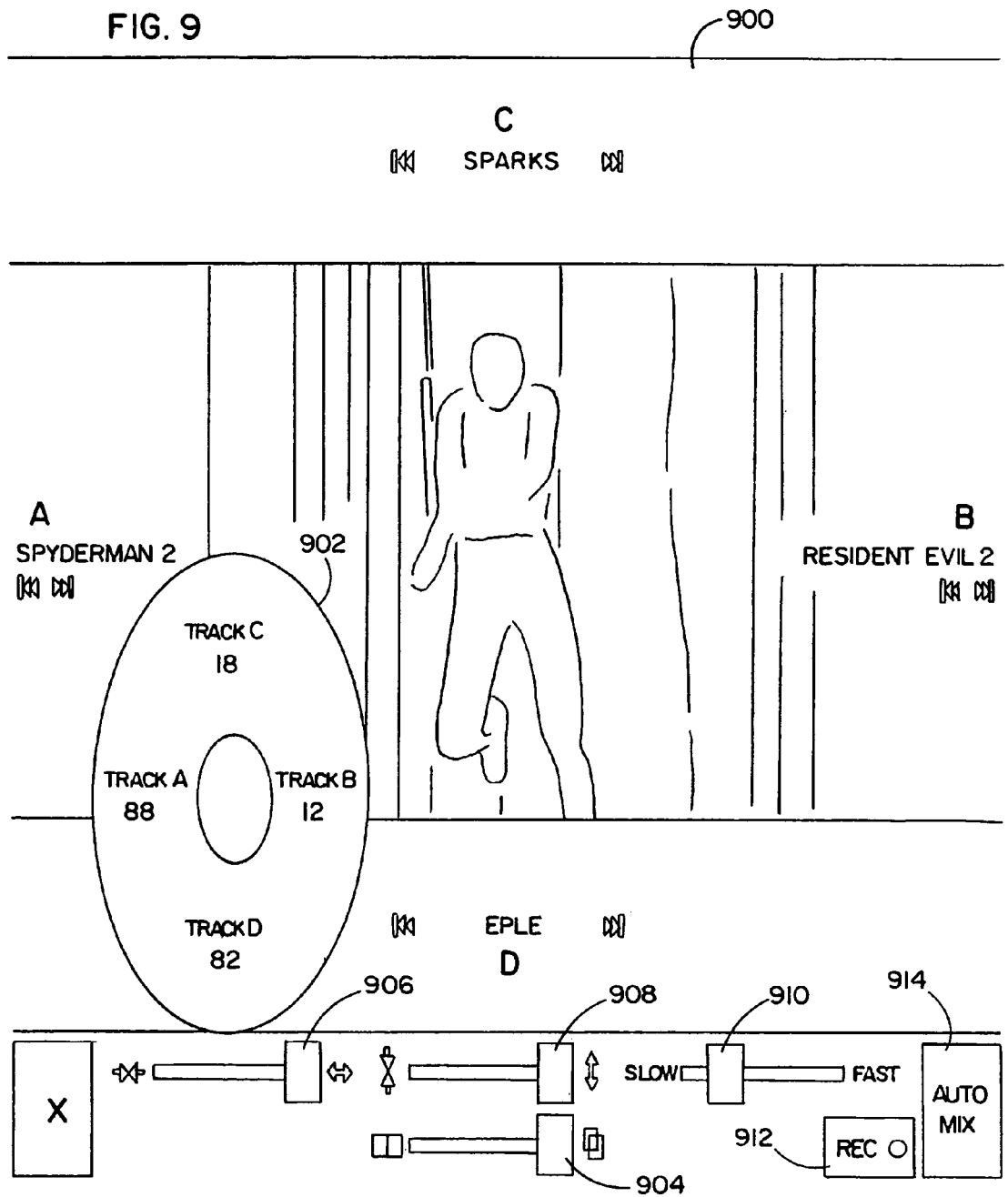
FIG. 9 is a diagram showing one interface for mixing audio and visual content according to the present invention.

Referring now specifically to FIG. 9, another example of a user interface 900 is described. The user interface 900 comprises an icon 902, an overlap slider 904, a horizontal position slider 906, a vertical position slider 908, a speed slider 910, a record button 912, and an automix button 914. The icon 902 is positioned at the top center of the interface 900 and indicates that for the audio mix, track C constitutes 18 percent and track D constitutes 82 percent of the audio mix. As for the video mix, the icon 902 shows that track A constitutes 88 percent and track B constitutes 12 percent of the video mix.

The overlap slider 904 is positioned at the far right side of its sliding range and indicates that there is full overlap of the video segments (i.e., the video segments are placed one on top of the other). In addition, the horizontal position slider 906 restricts the movement of the icon 902 in the horizontal direction. In this case, the position of the horizontal position slider 906 indicates that full horizontal movement of the icon 902 across the interface 900 is permitted. Furthermore, the vertical position slider 908 restricts movement of the icon 902 in the vertical direction. In this example, the position of the vertical position slider 908 indicates full movement of the slider is permitted in the vertical direction.

The speed slider 910 determines how fast an icon can be moved across the display (e.g., when in playback mode). As mentioned, the position of the icon 902 defines how the media is mixed. Consequently, the degree of the mix changes quite rapidly when the icon is set to move fast by the speed slider 910. In contrast, the degree of the mix changes slowly when the icon 902 is set to move slowly by the speed slider 910.

The record button 912 may be used to record movements of the icon for future playback. Finally, the auto mix 914 button may generate an automatic (e.g., random) mixing of media streams.

Thus, audio and visual content are mixed together using intuitive approaches where a human user can quickly and conveniently mix audio and visual content as desired. The approaches described herein are easy to use and understand and do not require extensive training or consultation with outside informational sources such as user manuals.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A method for mixing audio and visual streams, the method comprising: providing a visual display interface having an icon associated therewith; providing a plurality of display areas on the visual display interface; displaying information about a plurality of media streams in the plurality of display areas; dragging the icon across the visual display interface in a movement; and mixing the plurality of media streams according to a position of the icon, wherein the position of the icon indicates an amount of each media stream of the plurality of media streams in the mix, wherein the mixing step comprises: mixing a first audio stream and a second audio stream, and mixing a first visual stream and a second visual stream, wherein the dragging step comprises dragging the icon in both a horizontal direction and a vertical direction, wherein dragging the icon in the vertical direction causes the first audio stream and the second audio stream mix to be adjusted, and wherein dragging the icon in a generally horizontal direction causes the first visual stream and the second visual stream mix to be adjusted.

2. The method of claim 1, wherein in the step of dragging the icon across the visual display interface the icon is dragged in generally a vertical direction.

3. The method of claim 2 wherein in the step of mixing the plurality of media streams according to the position of the icon the first audio stream and the second audio stream mix is adjusted based on the movement to create a new mix.

4. The method of claim 1, wherein in the step of dragging the icon across the visual display interface icon is dragged in generally a horizontal direction.

5. The method of claim 4 wherein in the step of dragging the icon across the visual display interface the first visual stream and the second visual stream mix is adjusted based on the movement to create a new mix.

6. The method of claim 1, further comprising providing a visual overlap slider to control a degree of overlap between the first visual stream and the second visual stream.

7. The method of claim 1, further comprising recording the movement of the icon.

8. The method of claim 1, wherein dragging the display icon comprises manually dragging the icon.

* * * * *

UNITED STATES PATENT AND TRADEMARK OFFICE
CERTIFICATE OF CORRECTION

PATENT NO. : 7,774,706 B2  
APPLICATION NO. : 11/385469  
DATED : August 10, 2010  
INVENTOR(S) : Sakai Page 1 of 1

It is certified that error appears in the above-identified patent and that said Letters Patent is hereby corrected as shown below:

Claim 8, column 10, line 22, delete "display".

Signed and Sealed this
Fifteenth Day of May, 2012

David J. Kappos
*Director of the United States Patent and Trademark Office*